United States Patent Office 3,730,917
Patented May 1, 1973

3,730,917
SELF-EXTINGUISHING POLYURETHANE FOAM COMPOSITE AND BINDER COMPOSITION THEREFOR
Robert G. Hesskamp, St. Louis, Mo., assignor to M R Plastics and Coatings, Inc., Maryland Heights, Mo.
No Drawing. Filed July 31, 1970, Ser. No. 60,098
Int. Cl. C08g 22/44, 51/30, 51/58
U.S. Cl. 260—2.5 AK        7 Claims

ABSTRACT OF THE DISCLOSURE

A self-extinguishing flexible composite material useful as carpet padding, for example, is prepared by binding together particulate polyurethane foam material using a fire retardant binder composition comprising an isocyanate compound, a urethane prepolymer consisting of the reaction product of an isocyanate compound with a polyether polyol, and a fire retardant represented by the formula:

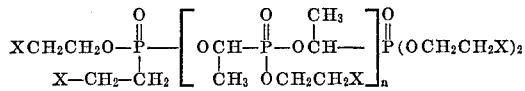

where X is chlorine or bromine and $n$ is an integer between 0 and 6, inclusive. Methods of preparing the self-extinguishing composite are described. By use of optimum amounts of the fire retardant, increased tensile strength is also imparted to the composite.

BACKGROUND OF THE INVENTION

This invention relates to the field of polyurethane foam products, and more particularly, to a flame retardant binder for the preparation of self-extinguishing composites of particulate foam material.

Polyurethane foam is in common use as a light construction material, insulation material, etc. In fabrication of polyurethane foam products, a certain amount of scrap material is inevitably generated. This scrap material may be reclaimed, reduced to particulate form, and used to produce a useful, flexible composite material with the aid of a binder to bind together the particles of scrap foam. Because it is normally made from scrap material, such a composite usually has a cost advantage over flexible polyurethane foam material freshly prepared from the basic chemical raw materials. Numerous useful products are prepared from a flexible scrap foam composite, such as carpet underlay or padding and such products have been known to the art for some time.

Though the flexible scrap foam composite materials known heretofore have been both useful and economical, all such materials previously available have suffered the disadvantage of being flammable. Flammability of these composites raises obvious hazards where, for example, a scrap foam composite is used as carpet underlay for installation in the home. In applications where the risk of fire is high, of course, flammable composite materials are not considered suitable for use.

There has thus been a need in the art for a flexible urethane foam scrap composite material which is both economical and fire resistant, and for an economical binder composition which would impart fire resistance to the composite without adversely affecting the other desired properties thereof. This need has remained unfulfilled prior to the present invention, however, because of the ineffectiveness or incompatability with scrap foam composites exhibited by almost all known fire retardants.

Certain types of flame retardants, for example, are chemically incompatible with the conventional urethane prepolymers generally used heretofore as binders for the composite. Thus, a commercial fire retardant such as diethyl-N,N-bis 2-hydroxyethyl amino ethyl phosphonate (sold under the trade name "Fyrol 6" by Stauffer Chemical Co.) contains hydroxy and amino groups, which react with the free isocyanate groups of the prepolymer and progressively destroy its effectiveness as a binder. No fire retardant of this type containing moisture, carboxylic acid, or reactive hydroxy or amino groups can be practically used to prepare a urethane prepolymer binder composition.

Certain other commercially available flame retardants are physically incompatible with the conventional prepolymer binder compositions. Thus, tris (dichloropropyl phosphate) (sold under the trade name "Fyrol 2" by Stauffer Chemical Co.) is immiscible with the binder and thus cannot be physically incorporated therein.

There are various other flame retardants which are somewhat effective in imparting fire resistance but which are incompatible with other essential properties or attributes of a composite foam material. A mixture of antimony oxide and chlorowax may, for example, be used, but large quantities of this mixture must be employed to achieve an acceptable degree of fire retardancy, and the antimony oxide remains as a powder which imparts an undesirable dusty character to the foam in the final product.

Brominated polyether urethane prepolymers (such as that sold under the trade name "Brominex 9115" by Swift Chemical Co.) are effective, but only if used in such very large proportions (approximately 30% by weight of the foam) that a very rigid composite results. Since the principal applications for foam composites, such as carpet underlay, require that the composite be flexible, brominated polyether urethane prepolymers are not practically useful for this purpose.

A brominated polyether polyol (such as that marketed under the trade designation "Brominex 126" by Swift Chemical Co.) may also serve as an effective fire retardant, but again large quantities must be used. In view of this fact and the high price of these materials, brominated polyether polyols are not practically useful as flame retardants in foam composites, whose marketability is largely related to their relatively low cost.

Chlorinated paraffins can also impart flame retardancy to a polyurethane foam composite but such large quantities are required that the mechanical properties of the foam composite are adversely effected. Thus, chlorinated paraffins likewise fail as practically useful flame retardant ingredients for foam binder compositions.

As may be seen from the above, the problem of imparting flame resistance to polyurethane scrap foam composites has remained a most difficult problem which has resisted solution through the use of known fire retardants. Prior to the present invention, there has been no known method for economically producing a flexible fire resistant composite.

SUMMARY OF THE INVENTION

Among the several objects of the present invention, therefore, may be noted the provision of a binder for particulate polyurethane foam which effectively imparts fire resistance to a foam composite; the provision of such a binder which produces a flexible composite foam material of increased tensile strength; the provision of such a binder whose use does not substantially increase the cost of the foam composite; the provision of a flexible, economical, self-extinguishing foam composite; and the provision of methods for preparing such a composite. Other objects will be in part apparent and in part pointed out hereinafter.

The present invention is thus directed to a fire retardant binder composition useful for binding together particulate polyurethane foam which comprises a mixture of at least one isocyanate compound selected from the group consisting of organic diisocyanates, triisocyanates and polyisocyanates, a urethane prepolymer consisting of the reaction product between such an isocyanate compound and a polyether polyol, and a fire retardant represented by the formula:

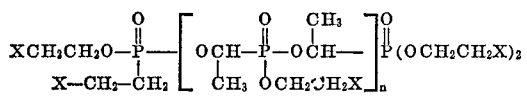

where X is chlorine or bromine and $n$ is an integer between 0 and 6, inclusive. The invention is further directed to a self-extinguishing composite material which comprises particles of polyurethane foam bonded together by the polymerization product of the above binder composition. Also included in the invention is a method of preparing a self-extinguishing composite material consisting of particles of polyurethane foam bonded together, which method comprises the steps of preparing a formulation comprising a mixture of a polyether polyol, an isocyanate compound selected from the group consisting of organic diisocyanates, triisocyanates, and polyisocyanates, and a fire retardant represented by the formula:

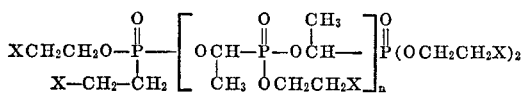

where X is chlorine or bromine and $n$ is an integer between 0 and 6, inclusive; prereacting said polyether polyol and said isocyanate compound at a temperature not higher than about 170° F. under an inert atmosphere to initiate formation of a prepolymer; allowing the prereaction product to polymerize under an inert atmosphere; mixing the resultant binder composition with particles of polyurethane foam; and compressing the foam/binder mixture in the presence of a curing agent to produce a cohesive composite product of said particles of polyurethane foam bonded together.

DESCRIPTIONS OF THE PREFERRED EMBODIMENTS

While no other commercially available flame retardants have been found to work satisfactorily, I have discovered that the above defined binder compositions including compounds having the formula:

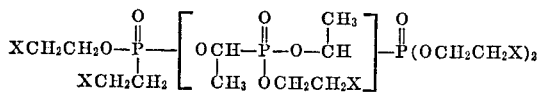

where X is bromine or chlorine and $n$ is an integer between 0 and 6, inclusive, can be used to produce a novel composite foam material which is strong, flexible and self-extinguishing. An example of such a compound is that represented by the formula:

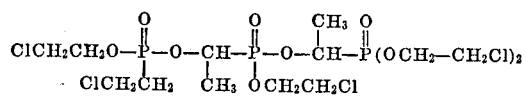

(sold under the trade name Phosgard C-22-R by the Monstanto Co.). The binder compositions of this invention are single component systems having a pot life in excess of six months. Moreover, they are both economical to prepare and economical to use, little if any more than conventional amounts of binder being required for the preparation of self-extinguishing foam composites. Further, in the preferred form of the invention, the addition of the fire retardant unexpectedly imparts enhanced tensile strength to the final composite material.

The binder compositions of this invention are prepared by simply incorporating appropriate quantities of the above-noted fire retardant compounds in otherwise conventional formulations for urethane prepolymer binders. Thus, a polyether polyol, an excess of an organic diisocyanate, triisocyanate or polyisocyanate, and the fire retardant compound are turbulently blended at a temperature less than about 170° F. under an inert atmosphere for a period sufficient to insure homogeneity. Initial formation of a urethane prepolymer from the polyol and the isocyanate compound takes place during blending. The blended formulation must be held for a period prior to use in order to allow sufficient polymerization for an effective binder to be formed. The necessary degree of polymerization may be accomplished in two hours at temperatures close to 170° F. At room temperature, the blend should be held for about 48 hours.

One convenient method of preparing the binder is to mix the components in a stirred tank under an inert atmosphere at a temperature of about 90° F. for 45 minutes to 1 hour, after which a pre-reaction product is drummed off, also, under an inert atmosphere. After drumming, the product is allowed to stand for at least about 48 hours before use in preparing foam composites.

The amount of fire retardant which must be contained in the binder in order to impart fire resistance to the foam composite depends on the quantity of binder used. Normally, the fabrictors of foam composites use no more than about 10% to 12% by weight of binder based on the weight of the foam present. This represents only about 1% by volume. I have found that a binder used in such conventionally small amounts, and incorporating only 10% to 35% by weight of the above-noted fire retardant, successfully produces the self-extinguishing foam composite of this invention. In applications where larger amounts of binder are used, the binder may contain proportionately less fire retardant. Thus, I have discovered that, while most fire retardants are either ineffective, or must be used in impractically large proportions to be effective, the particular fire retardants used in this invention impart the desired self-extinguishing property to the foam composite at a level of less than one-half percent by volume of the composite.

The maximum concentration of fire retardant compound in the binder composition, compatible with good results, is about 35% by weight. Above that concentration the fire retardant compound tends to behave as a plasticizer, adversely affecting the mechanical properties of the foam composite, such as tensile strength. Surprisingly, however, if the fire retardant concentration in the binder lies within the above specified 10% to 35% by weight range, its presence actually imparts increased tensile strength to the composite foam. Moreover, if the fire retardant concentration is between about 23% and 33% by weight of the binder, the tensile strength of foam composites prepared therefrom is markedly superior to the tensile strength of foam composites prepared with conventional binders. This phenomenon is not understood, but tests show that a composite prepared using about 11% by weight of a binder, which in turn contains between about 23% and about 33% by weight of the above-noted fire retardant compound, has a tensile strength about 50% to 130% higher than a foam composite prepared with conventional binders. The preferred binder of this invention contains about 25% by weight of Phosgard C-22-R.

As indicated above, the other essential components of the composition of this invention constitute a conventional mixture of a polyether urethane prepolymer and an organic diisocyanate, triisocyanate or polyisocyanate, The prepolymer is the reaction product of the isocyanate compound and a polyether polyol. Typically useful isocyanate compounds include toluene 2,4-diisocyanate, toluene 2,6-diisocyanate, diphenylmethane diisocyanate, hexamethylene diisocyanate, 1,5-naphthalene diisocyanate, triphenylmethane triisocyanate, xenylene diisocyanate, and chlorophenylene diisocyanate. Polyisocyanates such as polymeric toluene diisocyanate (sold under the trade name "Rubinate T" by the Uniroyal Co.) and polymeric diphenylmethane diisocyanate (sold under the trade name "Papi" by the Upjohn Co.) may also be used. Polyether polyols useful in the formulations of this invention include, e.g., polyoxyethylenes, polyoxypropylenes and polyoxybutylenes having molecular weights between about 2,500 and about 6,000 as produced by the polyol initiated polymerization of ethylene oxide, propylene oxide, and butylene oxide, respectively. Typical initiators include ethylene glycol, trimethylolethane, and propane, butane, pentane, and hexane triols. Glycerol initiated polyoxypropylene is a preferred ingredient in the formulations of this invention.

For the binder composition to serve its purpose, it must contain free isocaynate groups to react with the curing agent in forming the foam composite. Thus, in preparing the binder formulation, the isocyanate compound and polyether polyol should be added in such relative proportions that the formulation as a whole contains between about 2% and about 10% by weight free isocyanate groups, i.e., isocyanate groups in excess of hydroxy groups. Normally, the formulation contains between about 25% and about 75% by weight of the polyol and between about 5% and about 40% by weight of the isocyanate compound.

The binder compositions of this invention typically have a viscosity of between about 100 and about 2,000 centipoises, as measured by a Brookfield RVT viscometer, using a No. 2 spindle, operated at 20 r.p.m. at 78° F. In a preferred embodiment of this invention, the binder formulation contains a small percentage on the order of 4% to 10% by weight of a nonflammable low molecular weight organic solvent, e.g., methylene chloride or perchlorethylene, as a thinner. Where the isocyanate component of the formulation is a polymeric isocyanate, larger amounts of thinner, e.g. 20% to 25% may be desirable. Where used, the thinner is conveniently incorporated in the binder formulation by simply adding it along with the other ingredients, as described above.

In the preparation of the self-extinguishing foam composite material of this invention, particulate polyurethane foam which has been rendered free of wood, scrim, or other contaminants, is mixed with at least about 10% by weight of the above described fire retardant binder composition. The resulting mixture is then placed in compression for a few minutes in the presence of a curing agent to produce the composite. The curing agent may be either water on an amine, such as, e.g., triethylenediamine, tetramethylbutane diamine, dimethylethanolamine, diethanolamine, and trimethyl guanidine. If an amine is used, it is added to the foam/binder mixture immediately before the mixture is put under compression. If water is used, it may be added in liquid form under the same circumstances as described for an amine or, alternatively, water vapor may be passed into the foam/binder mixture after the latter has been put under compression.

A self-extinguishing, flexible composite may be pepared in the above manner at a cost which is not substantially higher than the cost of preparing the flammable composites previously known to the art. As noted, the tensile strength of the composite is also improved, and where the binder composition contains between about 23% and about 33% by weight of the fire retardant, the composite possesses greatly superior tensile strength.

The following examples illustrate the invention:

EXAMPLE 1

A binder formulation was prepared by mixing the following ingredients in the indicated proportions.

| | Percent |
|---|---|
| Polyether polyol having a molecular weight of about 4100 (sold under the trade name CP-4100 by the Dow Chemical Co.) | 50.00 |
| Toluene diisocyanate (80% 2,4-isomer, 20% 2,6-isomer) | 16.00 |
| Methylene chloride | 4.00 |
| Phosgard C-22-R | 30.00 |
| | 100.00 |

The formulation was subjected to moderate agitation under an inert atmosphere at a temperature of around 90° F. for a period of about 45 minutes and then discharged into drums. The drums were allowed to stand for a period of about 48 hours so that the formulation could self-cure into a useful binder composition. After self-curing, the binder had a viscosity of about 1300 centipoises.

About 11% by weight of the binder composition was mixed with particulate polyurethane foam material which had been in turn prepared by chopping up polyurethane foam scrap. The foam/binder mixture was thoroughly mixed and then placed under compression between two perforated steel plates. Water vapor was passed through the perforations into the compressed mixture to cure the binder. After a few minutes, a pad of foam composite material was removed from between the plates.

A standard 0.5 mg. flammable methenamine pill was placed on the composite pad thus produced, and another such pill placed on another pad produced using a conventional binder. Both pills were ignited and allowed to burn. After the pills were consumed, all combustion ceased on the pad prepared with the binder incorporating Phosgard C-22-R while the pad prepared using a conventional binder continued to burn.

Another pad was prepared using the fire retardant binder of this example. This pad was subjected to a standard test for determination of tensile strength. The pad was found to have a strength of 12 p.s.i., about 100% higher than the 6 p.s.i. tensile strength typically exhibited by pads prepared using conventional binders.

EXAMPLE 2

A binder formulation was prepared by mixing the following ingredients in the indicated proportions.

| | Percent |
|---|---|
| Polyether polyol having a molecular weight of about 3500 (sold under the trade name CP-3500 by the Dow Chemical Co.) | 50.00 |
| Toluene diisocyanate | 25.00 |
| Phosgard C-22-R | 25.00 |
| | 100.00 |

A binder, which had a viscosity of 2,000 centipoises, was prepared from this formulation and a foam composite prepared using the binder in accordance with the method described in Example 1. The comparative flame resistance test described in Example 1 was also run with the same result. After the standard pill was consumed, all combustion ceased on the pad prepared with the binder incorporating Phosgard C-22-R while the pad prepared using a conventional binder continued to burn.

A second pad prepared from the binder of this example was found to have a tensile strength of 14 p.s.i., over 130% higher than the normal tensile strength of pads prepared using conventional binders.

EXAMPLE 3

A binder formulation was prepared by mixing the following ingredients in the indicated proportions.

| | Percent |
|---|---|
| Polyether polyol having a molecular weight of about 4030 (sold under the trade name PG–4030 by the Olin Mathieson Co.) | 26.00 |
| CP–3500 | 26.00 |
| Toluene diisocyanate | 15.00 |
| Methylene chloride | 10.00 |
| Phosgard C–22–R | 23.00 |
| | 100.00 |

A binder having a viscosity of 910 centipoises was prepared from this formulation, and a foam composite prepared using the binder, in accordance with the method described in Example 1. The comparative flame resistance test described in Example 1 was also run with the same result. After the standard pill was consumed, all combustion ceased on the pad prepared with the binder incorporating Phosgard C–22–R while the pad prepared using a conventional binder continued to burn.

A second pad prepared from the binder of this example was found to have a tensile strength of 10.5 p.s.i., about 75% higher than the normal tensile strength of pads prepared using conventional binders.

EXAMPLE 4

A binder formulation was prepared by mixing the following ingredients in the indicated proportions.

| | Percent |
|---|---|
| CP–4100 | 50.00 |
| Toluene diisocyanate | 15.00 |
| Phosgard C–22–R | 20.00 |
| Methylene chloride | 15.00 |
| | 100.00 |

A binder having a viscosity of 800 centipoises was prepared from this formulation, and a foam composite prepared using the binder, in accordance with the method described in Example 1. The comparative flame resistance test described in Example 1 was also run with the same result. After the standard pill was consumed, all combustion ceased on the pad prepared with the binder incorporating Phosgard C–22–R while the pad prepared using a conventional binder continued to burn.

A second pad prepared from the binder of this example was found to have a tensile strength of 7.7 p.s.i., about 28% higher than the normal tensile strength of pads prepared using conventional binders.

EXAMPLE 5

A binder formulation was prepared by mixing the following ingredients in the indicated proportions.

| | Percent |
|---|---|
| CP–4100 | 52.00 |
| Toluene diisocyanate | 14.00 |
| Phosgard C–22–R | 25.00 |
| Methylene chloride | 9.00 |
| | 100.00 |

A binder having a viscosity of 1500 centipoises was prepared from this formulation, and a foam composite prepared using the binder, in accordance with the method described in Example 1. The comparative flame resistance test described in Example 1 was also run with the same result. After the standard pill was consumed, all combustion ceased on the pad prepared with the binder incorporating Phosgard C–22–R while the pad prepared using a conventional binder continued to burn.

A second pad prepared from the binder of this example was found to have a tensile strength of 9 p.s.i., about 50% higher than the strength of pads prepared using conventional binders.

EXAMPLE 6

A binder formulation was prepared by mixing the following ingredients in the indicated proportions.

| | Percent |
|---|---|
| CP–4100 | 50.00 |
| Toluene diisocyanate | 18.00 |
| Phosgard C–22–R | 12.00 |
| Methylene chloride | 20.00 |
| | 100.00 |

A binder having a viscosity of 760 centipoises was prepared from this formulation, and a foam composite prepared using the binder, in accordance with the method described in Example 1. The comparative flame resistance test described in Example 1 was also run with the same result. After the standard pill was consumed, all combustion ceased on the pad prepared with the binder incorporating Phosgard C–22–R while the pad prepared using a conventional binder continued to burn.

A second pad prepared from the binder of this example was found to have a tensile strength of 7.6 p.s.i., about 26% higher than the normal tensile strength of pads prepared using conventional binders.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. A fire retardant binder composition useful for binding together particulate polyurethane foam which comprises the product obtained by reaction of the isocyanate and polyol constituents of a mixture containing between about 5% and about 40% by weight of an organic polyisocyanate, between about 25% and about 75% by weight of at least one polyether polyol having a molecular weight of between about 2500 and about 6000, and between about 23% and about 33% by weight of a fire retardant compound represented by the formula:

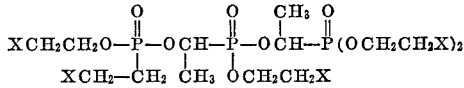

wherein X is chlorine or bromine, said binder composition having a viscosity of between about 100 and about 2000 cps. and containing between about 2% and 10% by weight of free isocyanate groups.

2. The binder composition set forth in claim 1 wherein said mixture additionally contains a low molecular weight nonflammable organic solvent as a thinner.

3. The binder composition set forth in claim 2 wherein the thinner is methylene chloride.

4. The binder composition set forth in claim 1 wherein the organic polyisocyanate is toluene diisocyanate.

5. The binder composition set forth in claim 1 wherein X is chlorine.

6. A self-extinguishing flexible composite material which comprises particles of polyurethane foam bonded together by the polymerization product of a binder composition, said binder composition being obtained by reaction of the isocyanate and polyol constituents of a mixture containing between about 5% and about 40% by weight of an organic polyisocyanate, between about 25% and about 75% by weight of at least one polyether polyol having a molecular weight of between about 2500 and about 6000, and between about 23% and about 33% by weight of a fire retardant compound represented by the formula:

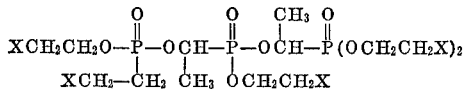

where X is chlorine or bromine, said binder composition having a viscosity of between about 100 and about 2000 cps. and containing between about 2% and about 10% by weight free isocyanate groups.

7. A method of preparing a self-extinguishing, flexible composite material consisting of particles of polyurethane foam bonded together, which method comprises the steps of:
  (a) preparing a mixture comprising between about 25% and about 75% by weight of a polyether polyol having a molecular weight of between about 2500 and about 6000, between about 5% and about 40% by weight of an organic polyisocyanate, and between 23% and about 33% by weight of a fire retardant compound represented by the formula:

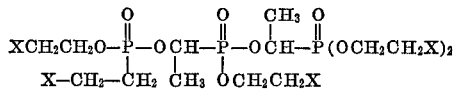

where X is chlorine or bromine;
  (b) allowing the formulation to polymerize at a temperature not higher than about 170° F. under an inert atmosphere thereby producing a binder composition having a viscosity of between about 100 and about 2000 centipoises and containing between 2% and 10% by weight of free isocyanate groups;
  (c) mixing said binder composition with particles of polyurethane foam; and
  (d) compressing the foam/binder mixture in the presence of a curing agent to produce a cohesive composite product of said particles of polyurethane foam bonded together.

References Cited

UNITED STATES PATENTS

| | | | |
|---|---|---|---|
| 3,401,128 | 8/1968 | Terry | 260—2.5 |
| 3,332,893 | 7/1967 | Birum et al. | 260—2.5 |

FOREIGN PATENTS

| | | | |
|---|---|---|---|
| 898,272 | 6/1962 | Great Britain | 260—2.5 AK |
| 867,235 | 5/1961 | Great Britain | 260—2.5 AK |
| 1,382,197 | 1964 | France | 260—2.5 AK |

OTHER REFERENCES

Jefferson Chemical Co. Bulletin, "Non-Reactive Fire Retardants etc." (1967), 13 pages.

"Phosgard C-22-R," Data Bulletin of Monsanto Company, St. Louis, Mo., not dated.

DONALD E. CZAJA, Primary Examiner

H. S. COCKERAM, Assistant Examiner

U.S. Cl. X.R.

260—2.5 AJ, 33.8 UB, 45.7 P, 77.5 AR